United States Patent [19]

Leonard

[11] Patent Number: 4,781,210
[45] Date of Patent: Nov. 1, 1988

[54] REPLACEMENT INLET VALVE ASSEMBLY FOR A TOILET TANK

[76] Inventor: James E. Leonard, 1521 Cathedral Dr., Margate, Fla. 33063

[21] Appl. No.: 157,696

[22] Filed: Feb. 19, 1988

[51] Int. Cl.[4] ........................ F16K 43/00; F16K 31/26
[52] U.S. Cl. .................................... 137/315; 137/440; 137/441; 137/444; 137/445; 137/591
[58] Field of Search ............... 137/315, 434, 440, 441, 137/442, 444, 445, 591

[56] References Cited

U.S. PATENT DOCUMENTS

| | | | |
|---|---|---|---|
| 936,742 | 10/1909 | Rumsey | 137/440 |
| 1,547,255 | 7/1925 | Mueller | 137/426 |
| 2,014,483 | 9/1935 | Price et al. | 137/442 |
| 2,146,794 | 2/1939 | Clemmons | 137/444 |
| 2,488,457 | 11/1949 | Wallner | 137/440 |
| 2,536,921 | 1/1951 | Duke | 137/441 |
| 2,608,987 | 9/1952 | Collman | 137/591 |
| 2,730,127 | 1/1956 | Hansen | 137/440 |
| 2,807,024 | 9/1957 | Kapp | 137/441 |
| 3,006,359 | 10/1961 | Lister | 137/445 |
| 3,024,799 | 3/1962 | Flieder | 137/440 |
| 3,038,491 | 6/1962 | Beazley | 137/445 |
| 3,107,747 | 10/1963 | Parkison | 181/234 |
| 3,585,646 | 6/1971 | Lopez | 4/343 |
| 4,038,707 | 8/1977 | Cass | 4/324 |
| 4,229,846 | 10/1980 | English, Jr. | 4/396 |

FOREIGN PATENT DOCUMENTS 1336355 11/1973 United Kingdom ............... 137/434

Primary Examiner—George L. Walton
Attorney, Agent, or Firm—Oltman and Flynn

[57] ABSTRACT

A replacement inlet valve assembly for use in a toilet tank now having an inlet valve with a water inlet on the side. This invention has a ballcock-operated inlet flush valve with a bottom inlet and a generally S-shaped inlet conduit rigidly attached to the inlet valve so that they can be handled as a unit. The inlet conduit has a first vertical leg offset laterally from the valve and adapted to extend up through a chamber separate from the toilet tank's water chamber, a second vertical leg extending down from the bottom inlet on the valve, and a serpentine segment extending from the upper end of the first vertical leg to the lower end of the second vertical leg.

3 Claims, 2 Drawing Sheets

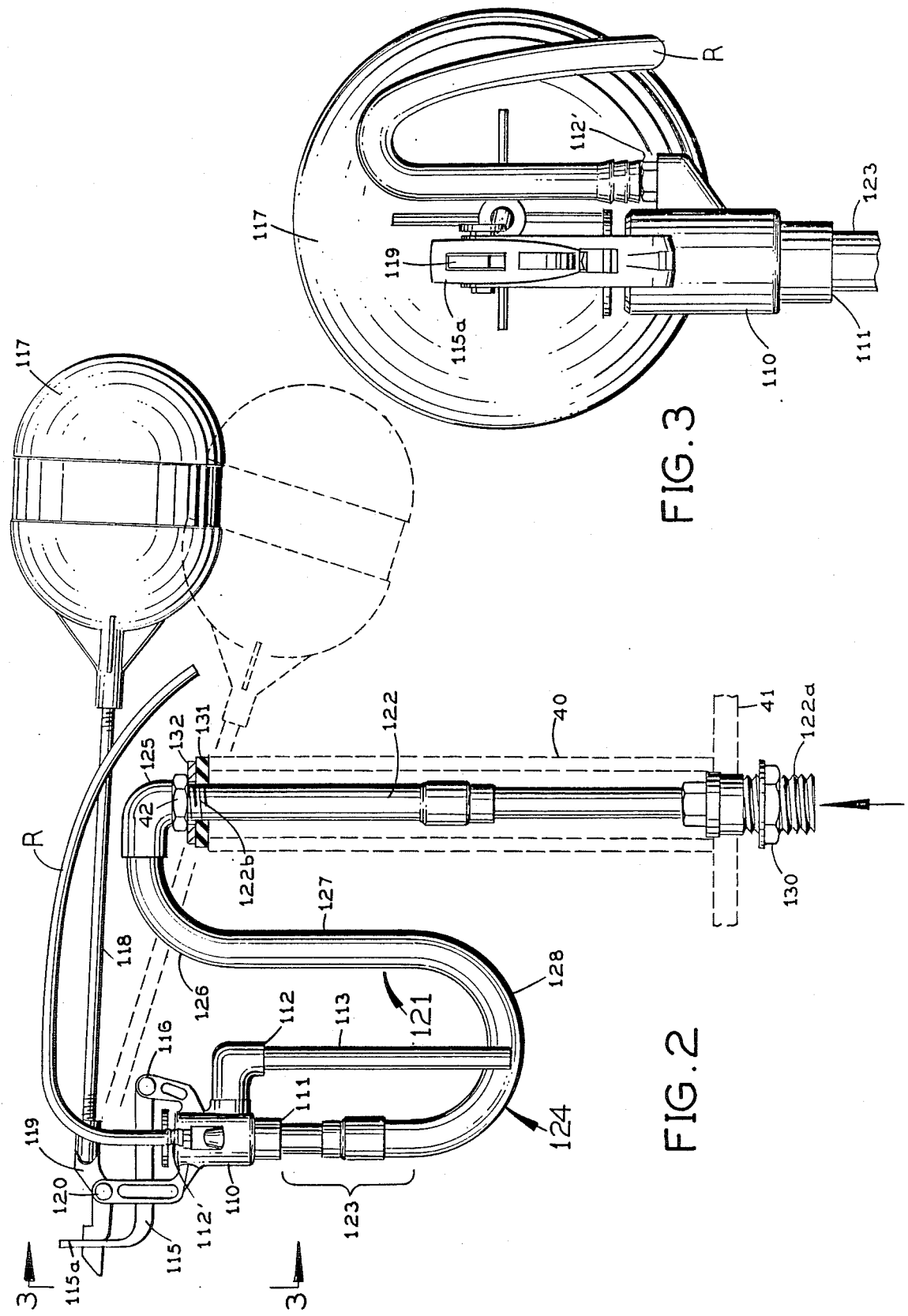

REPLACEMENT INLET VALVE ASSEMBLY FOR A TOILET TANK

This invention relates to a replacement inlet flush valve assembly for a toilet tank.

BACKGROUND OF THE INVENTION

Many hotels and motels have been equipped with toilets in which the vertical water inlet pipe to the toilet tank comes up through a chamber which is separate from the water chamber of the tank. In one form of such toilets this separate chamber is physically outside the toilet tank. In another form this separate chamber is formed by a cylindrical housing extending up within the toilet tank but sealed from it in water-tight fashion at the top and bottom. In both forms the upper end of the vertical water inlet pipe was connected by a horizontal pipe to a side inlet opening in a toilet tank water inlet valve operated by a ballcock. These side-inlet ballcock-operated valves are not available any longer so that when such a valve no longer functions properly it cannot be easily replaced with a ballcock-operated water inlet valve having a bottom inlet opening that is not aligned with the horizontal pipe extending from the upper end of the vertical water inlet pipe.

SUMMARY OF THE INVENTION

The present invention is directed to a novel unitary water inlet toilet flush valve assembly for replacing the functionally comparable parts of an installation having a valve with a side inlet for the water.

Preferably, the present valve assembly comprises a ballcock-operated inlet valve of conventional design having a water inlet on the bottom, a conventional ballcock for operating that valve, and a generally S-shaped water inlet conduit with a first vertical leg offset laterally from the valve and having its upper end at a higher level than the water inlet on the bottom of the valve, a second vertical leg extending down from that valve inlet, and a reversely bent serpentine segment connecting the upper end of the first vertical leg to the lower end of the second vertical leg. The upper end of the first vertical leg and the adjacent part of serpentine segment form an inverted "U" part of the inlet conduit which extends over the top of the separate chamber and into the toilet tank.

A principal object of this invention is to provide a novel unitary replacement inlet flush valve assembly for a toilet tank.

Further objects and advantages of this invention will be apparent from the following detailed description of two presently preferred embodiments which are illustrated schematically in the accompanying drawings.

DESCRIPTION OF THE DRAWINGS

FIG. 2 is a similar view of a second embodiment; and

FIG. 3 is a fragmentary end elevation taken from the left end of FIG. 2.

Figure 1:
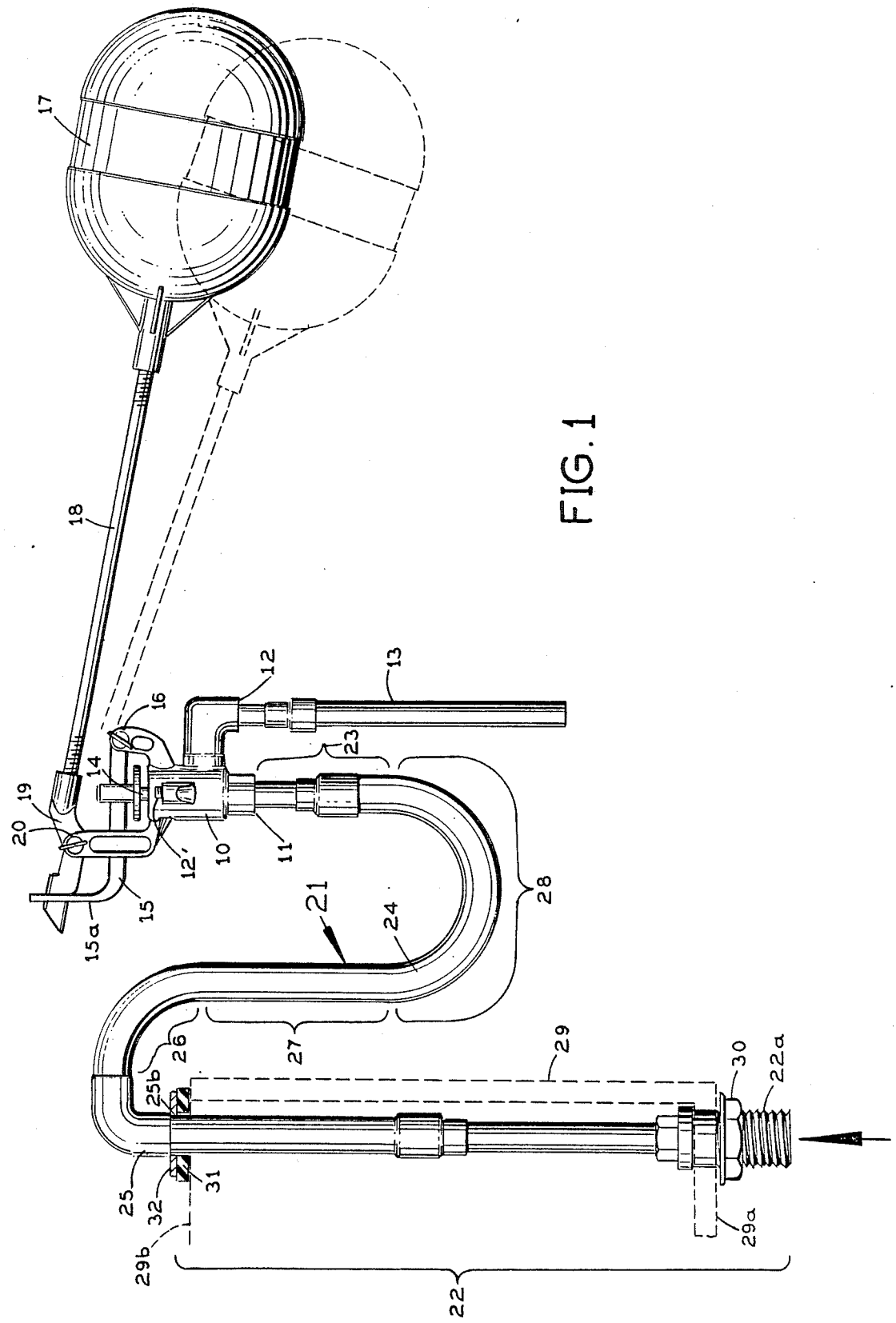
FIG. 1 is a side elevation of a toilet inlet flush valve assembly according to a first embodiment of the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Referring first to FIG. 1, an inlet flush valve of conventional construction has a housing 10 with a bottom inlet opening at 11 and an outlet opening at 12 spaced from the inlet opening. A toilet tank refill tube 13 extends down from the outlet opening 12 and is joined in fluid-tight fashion to the valve housing 10. The valve housing 10 also has a branch outlet opening at 12' where a flexible trap refill tube (not shown) may be attached. The inlet valve has a vertically displaceable valve plunger 14 for opening and closing the valve to either connect the inlet opening 11 to the outlet openings 12 and 12' or to block the inlet opening from the outlet openings in a known manner. The valve plunger 14 is coupled to a valve operating lever 15, one end of which is horizontally pivoted at 16 to the valve housing. The valve operating lever 15 is generally L-shaped or right-angled, with an upwardly extending vertical leg 15a at its end away from the pivot 16.

A float 17 is on one end of an elongated arm 18, the opposite end of which is screw-threadedly received in one end of a coupling body 19. The opposite end of coupling body 19 is slidably coupled to leg 15a of operating lever 15 in a known manner. About midway between its ends, coupling body 19 is horizontally pivoted at 20 on the valve housing. This provides a ballcock-operated means controlling the operation of the inlet valve.

When the water level in the toilet tank is high enough, it holds the float 17 up in a position holding valve plunger 14 down to keep the inlet valve closed. When water is released from the toilet tank at the bottom and the water level drops, the float 17 drops to a position as shown in phantom in FIG. 1. Through the linkage provided by arm 18, coupling body 19 and operating lever 15, the float raises the valve plunger 14, opening the inlet valve to pass water from its inlet at 11 to its outlets at 12 and 12'.

In accordance with the present invention, a generally S-shaped inlet conduit 21 connects the water inlet at 11 on the bottom of valve housing 10 to a water supply outside the toilet tank. This generally S-shaped inlet conduit comprises a first vertical leg 22 spaced laterally from the inlet valve housing 10, a second vertical leg 23 extending down from the inlet opening at 11 in the valve housing, and a reversely bent serpentine segment 24 which connects the upper end of the first vertical leg 22 to the lower end of the second vertical leg 23. The upper end of the first vertical leg 22 of inlet conduit 21 is at a higher level than the valve inlet at 11.

In the embodiment shown in FIG. 1, the reversely bent serpentine segment 24 of the water inlet conduit includes a right angled elbow 25 extending from the upper end of the first vertical leg 22 upward and then horizontally inward toward the valve housing 10, and an arcuate pipe segment 26 curving through a 90 degree angle inward and then downward from elbow 25 and forming with it substantially an inverted "U" part of the inlet conduit. A vertical portion 27 of the serpentine segment 24 extends down from the arcuate segment 26 to one end of an upright "U" portion 28, the opposite end of which is joined to the lower end of the second vertical segment 23, vertically aligned with and below the valve inlet opening at 11. Preferably, the different parts of the first vertical leg 22, the serpentine connecting segment 24 and the second vertical leg 23 of the S-shaped inlet conduit 21 are soldered to each other to provide a water-tight, unitary, rigid structure. Also, preferably, the valve housing 10 is rigidly joined in water-tight fashion to the upper end of the second vertical leg 23 so that the inlet valve, the ballcock for operating it, the tank refill tube 13 and the S-shaped inlet conduit 21 can be handled as a unit.

As shown in FIG. 1, the first vertical leg 22 of the inlet conduit extends up through a separate chamber 29 located completely outside the toilet tank in which the inlet valve 10 and its ballcock mechanism are located. The first vertical leg 22 has an externaly screw-threaded segment 22a on its lower end which is threadedly engaged by a nut 30 for engagement with the bottom wall 29a of this separate chamber. An annular gasket 31 of rubber-like material and an annular metal gasket 32 are sandwiched between the top edge 29b of this chamber and a downwardly-facing shoulder 25b provided by the bottom edge of elbow 25.

In the use of this replacement valve assembly, the existing inlet flush valve, tank refill tube, ballcock mechanism and inlet conduit are removed from the toilet tank and the separate chamber 29. Then the present replacement valve assembly is lowered into the toilet tank and the adjacent separate chamber 29, with the first vertical leg 22 of the inlet conduit being received in chamber 29 and the inverted "U" part 25,26 of the inlet conduit extending over the top edge of the toilet tank and the remainder of the reversely bent serpentine segment 24 of the inlet conduit, the second vertical leg 23 of the inlet conduit, the inlet valve, the tank refill tube 13 and the ballcock mechanism received in the toilet tank. The nut 30 on the first vertical 22 of the inlet conduit is tightened against the bottom of the separate chamber 29, causing the rubber-like gasket 31 to be squeezed between the top edge 29b of this chamber and the bottom edge of elbow 25.

FIGS. 2 and 3 show a different embodiment of the present invention in which the separate chamber for passing the first vertical leg of the inlet conduit is provided by a tube 40 extending up inside the toilet tank 41, as is common in some types of hotel and motel toilets. Elements of the inlet valve assembly in FIGS. 2 and 3 which correspond to those in the embodiment of FIG. 1 are given the same reference numerals plus 100 so that the detailed description of these elements need not be repeated.

Unlike FIG. 1, in FIGS. 2 and 3 the reversely bent segment 121 of the inlet conduit is on the same side of the valve housing 110 as the tank refill tube 113.

FIGS. 2 and 3 show a flexible trap refill tube R attached to the valve housing at the branch outlet 112'.

The first vertical leg 122 of the inlet conduit has a screw-threaded upper end segment 122b which threadedly receives a clamping nut 42 located just above the metal washer 132.

In the use of this replacement valve assembly, the existing inlet flush valve, tank refill tube, ballcock mechanism and inlet conduit are removed from the toilet tank and the separate chamber 40. Then the replacement valve assembly of FIGS. 2 and 3 is lowered into the toilet tank and the separate chamber 40, with the first vertical leg 122 of the inlet conduit extending down through chamber 40 and the inverted "U" part 125,126 of the inlet conduit extending up over the upper end of chamber 40 into the toilet tank. The rest of the inlet conduit, the inlet valve, the ballcock mechanism and the refill tube 113 are received in the toilet tank outside the separate chamber 40. The nuts 42 and 130 at the upper and lower ends of inlet chamber are tightened respectively against the top edge of chamber 40 and the bottom of the toilet tank 41 to clamp the unitary inlet valve assembly in this position.

From the foregoing it will be evident that the present unitary valve assembly enables an existing toilet inlet valve with a side inlet opening to be replaced readily and conveniently despite the mismatch in the locations of the respective water inlets of the valve that is being replaced and the valve that is replacing it.

I claim:

1. A unitary replacement inlet valve assembly for use with a toilet having a water tank including first and second compartments comprising the combination of:

a ballcock-operated inlet valve for said first compartment having a housing with a water inlet opening on the bottom and water outlet means spaced from said inlet opening;

and a ballcock mechanism for said first comparment operatively connected to said valve to control the flow of water from said inlet opening to said outlet means in accordance with the water level in said toilet tank;

and a generally S-shaped water inlet conduit having a first vertical leg for said second compartment being offset laterally from said valve and having its upper end at a higher level than said inlet opening in the valve, a second vertical leg for said first compartment extending down from said inlet opening in the valve, and a reversely bent serpentine segment for said first compartment connecting the upper end of said first vertical leg above the top of said second compartment when installed to the lower end of said second vertical leg, said connection above said second compartment having means for maintaining said first vertical leg in alignment with said second compartment;

said inlet valve houisng and said water inlet conduit being rigidly joined to each other to be handled as a single unit during installation.

2. An inlet valve assembly according to claim 1 wherein:

said first vertical leg of said inlet conduit is externally screw-threaded at its lower end; and further comprising:

a nut threadedly mounted on said screw-threaded lower end of said first vertical leg;

an annular washer of rubber-like material encircling said first vertical leg at its upper end;

and a rigid annular washer overlying said washer of rubber-like material and encircling said first vertical leg of the inlet conduit.

3. An inlet valve assembly according to claim 1 wherein:

said first vertical leg of said inlet conduit is externally screw-threaded at its upper end;

and further comprising:

a nut threadedly mounted on said screw-threaded upper end of said first vertical leg directly above said rigid washer.

* * * * *